US006225949B1

(12) United States Patent
Guard (10) Patent No.: US 6,225,949 B1
(45) Date of Patent: May 1, 2001

(54) METHOD AND APPARATUS FOR A RING INTERFEROMETER (75) Inventor: Glenn B. Guard, Laurel, MD (US)

(73) Assignee: Lockheed Martin Corporation, Syosset, NY (US)

( * ) Notice: Subject to any disclaimer, the term of this patent is extended or adjusted under 35 U.S.C. 154(b) by 0 days.

(21) Appl. No.: 09/218,043

(22) Filed: Dec. 22, 1998

(51) Int. Cl.$^7$ ............... G01S 5/04; G01S 13/00
(52) U.S. Cl. ............ 342/442; 342/445; 342/156
(58) Field of Search .................. 342/156, 442, 342/445

(56) References Cited

U.S. PATENT DOCUMENTS

| | | | |
|---|---|---|---|
| 4,975,710 | * 12/1990 | Baghdady | 342/442 |
| 5,457,466 | * 10/1995 | Rose | 342/442 |
| 5,526,001 | * 6/1996 | Rose et al. | 342/442 |
| 5,742,252 | * 4/1998 | Nguyet et al. | 342/442 |

OTHER PUBLICATIONS

Goodwin, Robert L., "Ambiguity–Resistant Three–and Four–Channel Interferometers", NRL Report 8005, Sep. 9, 1976.

Malloy, Neil J., "Analysis and Synthesis of General Planar Interferometer Arrays", IEEE ICASSP 83 Proceedings, Apr. 14–16, 1983.

* cited by examiner

*Primary Examiner*—Thomas H. Tarcza
*Assistant Examiner*—Fred H Mull
(74) *Attorney, Agent, or Firm*—Sterne, Kessler, Goldstein and Fox, PLLC (57) ABSTRACT

A method and apparatus for determining the azimuth and elevation angles of a signal from an emitter is provided. An antenna array receives the signal. The antenna array includes one or more pairs of antenna elements of like polarization mounted diametrically opposite each other in a ring. A switch receives the received signal from the antenna pairs. The switch outputs a processor-selectable number of signals. A radio frequency converter downconverts a processor-selectable number of signals. The converter outputs the downconverted signals. An intermediate frequency processor measures phase differences across the antenna pair baselines for the downconverted signals. The intermediate frequency processor outputs the measured frequency and phase difference data. An ambiguity resolution processor selects antenna pairs by controlling the switch. The ambiguity resolution processor receives the measured frequency and phase difference data from the intermediate frequency processor. The ambiguity resolution processor determines the azimuth and elevation angles of arrival corresponding to the signal.

16 Claims, 6 Drawing Sheets

METHOD AND APPARATUS FOR A RING INTERFEROMETER

BACKGROUND OF THE INVENTION

1. Field of the Invention

The present invention relates to electromagnetic direction finding, and more particularly, to using a ring interferometer to determine the azimuth and elevation angles of an emitter.

2. Related Art

Techniques of interferometry are commonly used in electromagnetic direction finding systems. For instance, radar interferometry may be used to determine the angle of arrival of a signal. An interferometer accomplishes this task by comparing the phase of the signal received at separate antennas or separate points on the same antenna By comparing the difference in phase of the received signals, the interferometer can determine the angle of arrival of the signal. The angle of arrival of a signal is generally described in terms of the azimuth and elevation angles. The azimuth angle is the angle between a horizontal reference direction and the direction of interest. The elevation angle is the angle that the signal makes with the horizontal plane.

A number of different antenna element configurations are used in interferometers. Linear interferometer configurations consist of antenna elements placed in a straight line. Planar interferometer configurations consist of a number of antenna elements in arbitrary planar arrangements. Linear interferometers and planar interferometers have been used in systems with broad frequency coverage. Methods for determining linear interferometer configurations are described by Robert L. Goodwin in "Ambiguity-Resistant Three- and Four-Channel Interferometers" (NRL Report 8005; Sep. 9, 1976). Methods for determining planar interferometer configurations are described by Neil J. Malloy in "Analysis and Synthesis of General Planar Interferometer Arrays" (IEEE ICASSP Proceedings; Apr. 14–16, 1983).

The methods described by Goodwin and Malloy depend upon using special integer relationships among the spacings of the antenna elements. Special integer relationships among the antenna element spacings are necessary for acceptable ambiguity resistance. Applications arise where it becomes difficult, if not impossible, to provide for these special integer relationships among antenna element spacings. For example, this difficulty arises when using pairs of antenna elements of like polarization that are mounted diametrically opposite each other in forward-boresighted ring arrays for tactical aircraft and missiles. The antenna elements are distributed around the missile body or around the structure of the aircraft behind the nose radome. This non-linear and non-planar antenna element configuration makes it extremely difficult to provide for the special integer relationships among antenna element spacings. What is needed is an interferometry system that does not require special integer relationships among antenna element spacings.

SUMMARY OF THE INVENTION

The present invention is directed to a method and apparatus for determining the azimuth and elevation angles of a signal. An antenna array includes one or more pairs of antenna elements of like polarization mounted diametrically opposite each other in a ring. Phase differences of a signal received across one or more antenna element pair baselines are measured. The azimuth and elevation angles of the signal using the measured phase differences are then determined.

The method of this invention includes the following steps: (a) measuring a phase difference across an antenna pair baseline for each of at least one antenna pair in the antenna array; (b) hypothesizing the azimuth and elevation angles of arrival of the signal; (c) calculating $u_H$ and $w_H$; (d) predicting ambiguity integers corresponding to the hypothesized azimuth and elevation angles of arrival for each of at least one antenna pair; and (e) determining the azimuth and elevation angles of arrival of the signal by determining which values of $AZ_H$, $EL_H$, and $M_{Hk}$ correspond to a minimized Q equation.

In a still further aspect of the present invention, a switch receives the received signal from the antenna pairs. The switch outputs a processor-selectable number of signals. A radio frequency converter downconverts a processor-selectable number of signals. The converter outputs downconverted signals. An intermediate frequency processor measures phase differences across the antenna pair baselines for the downconverted signals. The intermediate frequency processor outputs the measured frequency and phase difference data. An ambiguity resolution processor selects antenna pairs by controlling the switch. The ambiguity resolution processor receives the measured frequency and phase difference data from the intermediate frequency processor. The ambiguity resolution processor determines the azimuth and elevation angles of arrival corresponding to the signal.

FEATURES AND ADVANTAGES

The present invention provides a method and apparatus for ambiguity resolution in a ring interferometer.

The present invention further provides a method and apparatus for resolving ambiguities in a ring interferometer that does not exhibit special integer relationships among antenna element spacings.

Still further, the present invention provides a ring interferometer capable of accurately determining azimuth and elevation angles of an emitter.

BRIEF DESCRIPTION OF THE FIGURES

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the left-most digit(s) in the corresponding reference number.

DETAILED DESCRIPTION OF THE PREFERRED EMBODIMENTS

1. Overview

The present invention is directed to a method and apparatus for a ring interferometer. Generally speaking, the invention is usefull for finding the angle of arrival of a signal from an emitter, without requiring special integer relationships among antenna element spacings.

For tactical aircraft and missile applications, the polarization vectors of antenna elements are normal to the antenna element mounting surfaces. Because there are polarization-induced phase errors resulting from the use of pairs whose antennas are of unlike polarization, extensive array calibration methods are required to account for these phase errors. The present invention uses pairs of antenna elements of like polarization that are mounted diametrically opposite each other on the structure. Using only pairs of antenna elements of like polarization obviates the need for extensive antenna array calibration, because there are only very small polarization-induced phase errors for antenna elements of like polarization. Additionally, the present invention is useful for other applications where all antenna elements are of like polarization.

The present invention is useful for finding the azimuth and elevation angles of a signal from an emitter. In a preferred embodiment, the present invention is mounted in a tactical aircraft. In an alternative preferred embodiment, the present invention is mounted in a missile. For illustrative purposes, the invention is described herein with reference to these and other embodiments. It should be understood that the invention is not limited to these preferred embodiments. The invention is applicable to any application involving the use of interferometry.

2. Structure of the Invention

Figure 1:
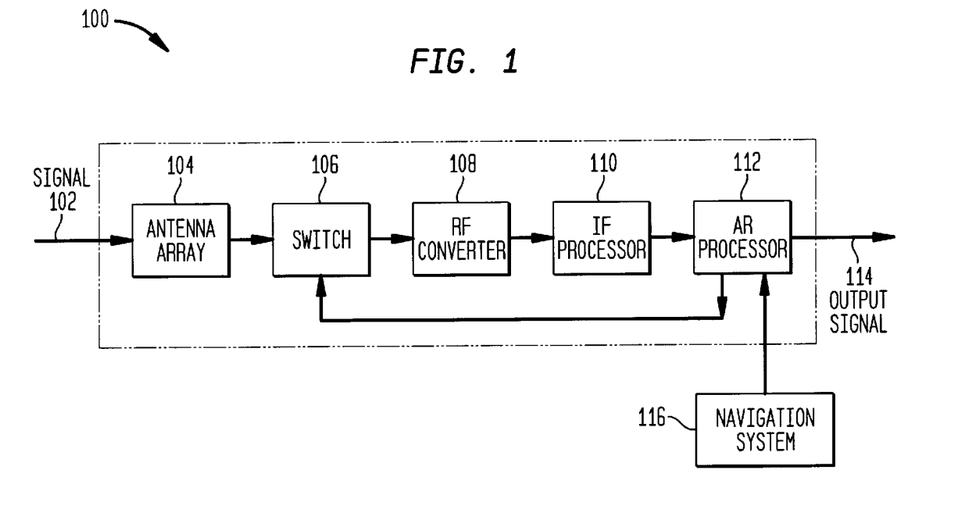
FIG. 1 shows a block diagram illustrating one embodiment of a ring interferometer apparatus.

FIG. 1 illustrates a ring interferometer apparatus 100 according to a preferred embodiment of the present invention. Ring interferometer apparatus 100 may be mounted in a variety of platforms. These platforms may include missiles, tactical aircraft, and commercial aircraft. Other potential platforms would be obvious to one skilled in the art.

Ring interferometer apparatus 100 includes an antenna array 104, a switch 106, a radio frequency (RF) converter 108, an intermediate frequency (IF) processor 110, and an ambiguity resolution (AR) processor 112. Ring interferometer apparatus 100 receives a signal 102, receives input from the platform's navigation system 116, and produces an output signal 114.

Ring interferometer apparatus 100 receives an impinging signal 102, determines its frequency and angle of arrival, and outputs these as output signal 114. The frequency of signal 102 received by antenna array 104 is typically in the range, but is not limited to the range, of from 2 GHz to 18 GHz. Switch 106 receives signals input from antenna array 104, and outputs a selectable number of signals to RF converter 108. RF converter 108 downconverts the signals and outputs the downconverted signals to IF processor 110. IF processor 110 measures frequency and phase differences (modulo 360 degrees) across the baselines for the pairs of antennas selected by AR processor 112, and outputs the measured frequency and phase data to AR processor 112. As will be recognized by those skilled in the art, the switch, RF converter, and IF processor can comprise any conventional switch, RF converter, and IF processor.

AR processor 112 selects antenna pairs by controlling switch 106. AR processor 112 receives the measured frequency and phase data of selected antenna pairs from IF processor 110, and receives the heading, pitch, and roll data from the platform's navigation system 116. AR processor 112 resolves the interferometer phase ambiguities as described below, performs heading, pitch, and roll corrections, and calculates the azimuth and elevation angles of arrival corresponding to the received signal. AR processor 112 outputs the azimuth, elevation, and frequency of the received signal as output signal 114.

Components of ring interferometer apparatus 100 of the present invention are described below.

Antenna Array

Figure 2:
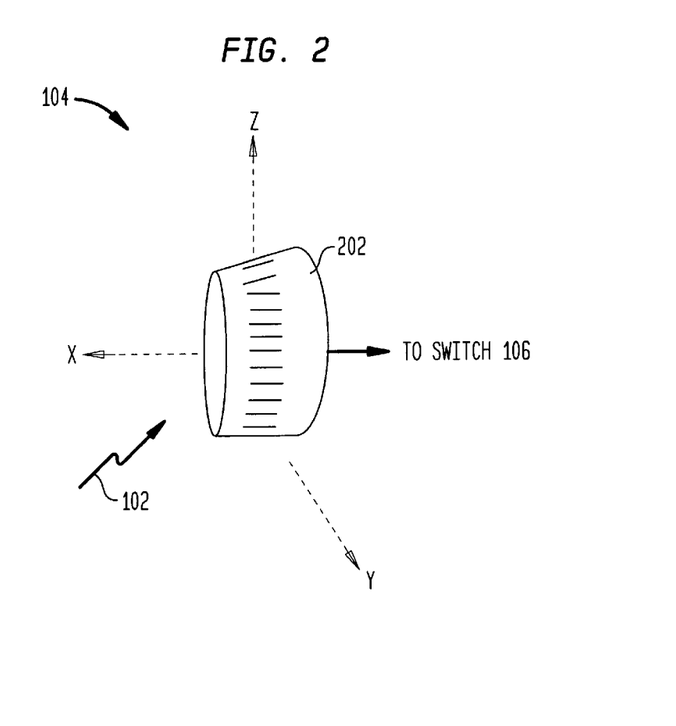
FIG. 2 shows an antenna array with antenna elements arranged in a ring configuration receiving a signal.

FIG. 2 shows an antenna array 104, where a signal 102 is received by antenna elements 202 arranged in a ring configuration. Antenna elements 202 are preferably surface-wave antennas. Antenna elements 202 are configured in pairs mounted diametrically opposite each other in the antenna array 104. Each pair has a baseline, which is the distance between the elements of the pair.

Figure 3:
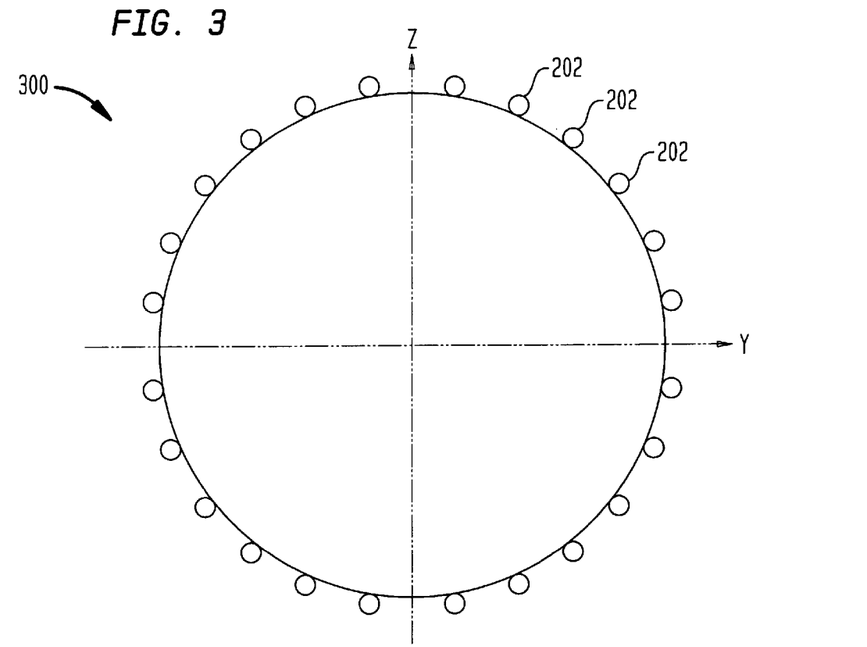
FIG. 3 shows an antenna array ring configuration forming a circle with a uniform diameter.
Figure 4:
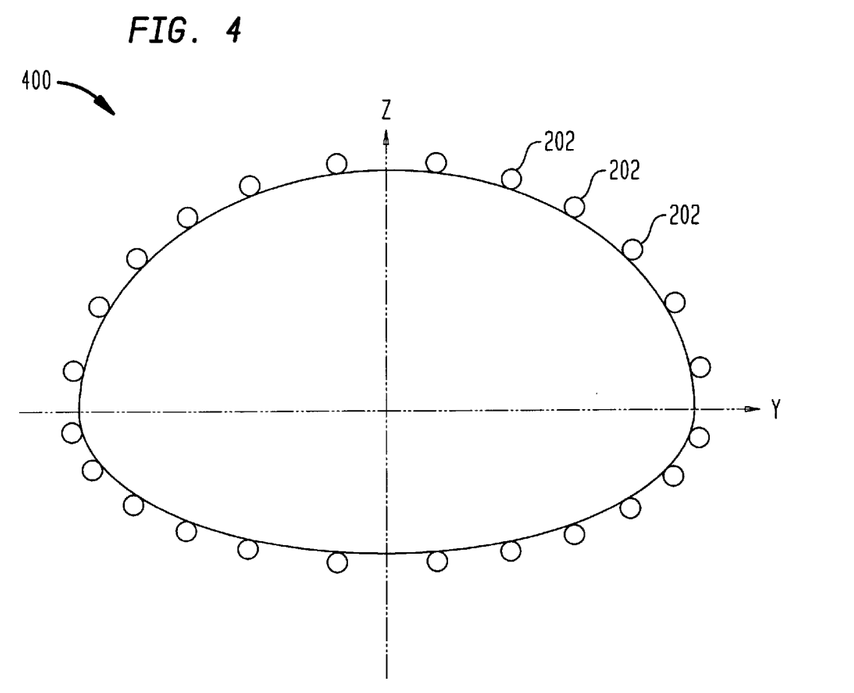
FIG. 4 shows an antenna array ring configuration with a non-uniform diameter.

For tactical aircraft and missile applications, the surface-wave antennas are mounted conformal to the structures, behind the nose radomes. In one embodiment, the platform in which ring interferometer apparatus 100 is mounted is a missile. Missiles are generally cylindrical in shape. Antenna elements 202 of an antenna array mounted in a missile will form a circle, with an essentially uniform diameter, as shown in FIG. 3. FIG. 3 shows an antenna array 300 with 24 antenna elements 202. An antenna array, however, is not required to form a perfect circle. In actuality, the ring configuration will conform to the shape of the platform in which it is mounted. For instance, in another embodiment, the structure in which the ring interferometer is mounted is a tactical aircraft such as an F-16. In this case, the ring follows the shape of the aircraft's fuselage. Such a ring configuration is shown in FIG. 4. FIG. 4 shows an antenna array 400 also with 24 antenna elements 202. Precision electrical measurement techniques may be required to determine the exact mounting positions for diametrically opposite antenna elements. Such techniques are well known to those of skill in the art.

The present invention uses pairs of antenna elements of like polarization that are mounted diametrically opposite each other on the structure. Using only pairs of antenna elements of like polarization obviates the need for extensive antenna array calibration, since there are only very small polarization-induced phase errors for antenna elements of like polarization. Additionally, the present invention is useful for other applications where all antenna elements are of like polarization.

The number of antenna pairs required is a system design variable. For example, small missiles typically would have fewer antennas than would tactical aircraft. In the embodiment shown in FIG. 2, and further illustrated below, 24 antenna elements make up the antenna array. In this embodiment, eight pairs of antenna elements were actually used to obtain precision direction finding (DF). This number of pairs is effective in this situation because the antenna baselines are so great in terms of wavelength that many 360-degree phase ambiguities need to be resolved. The present invention provides sufficient ambiguity resistance, despite the fact that the present invention does not utilize special integer relationships among the spacings of the antenna elements. To determine which eight antenna pairs to use is a function of the polarization of the impinging electromagnetic wave. Measurements of signal amplitude are used to help select the best eight antenna pairs for phase collection.

In another embodiment, it may be determined that the frequency range will have to be divided into two segments, which would result in needing two rings. In the two-ring embodiment, the higher frequency ring would be mounted forward of the lower frequency ring.

Normally, when a conventional antenna element is flush-mounted to a surface, its antenna pattern maximum is in a direction perpendicular to the mounting surface. The present invention, however, uses surface-wave antennas whose pattern maxima are in the forward direction. Each pair of antenna elements must have excellent phase-tracking characteristics, and the antenna patterns must be broad enough to support a significant forward field-of-view. Suitable elements for an antenna array will be apparent to one skilled in the art based on the present description.

Switch

Referring to FIG. 1, switch 106 outputs selected antenna pair signals to RF converter 108. AR processor 112 provides a signal to switch 106 to select antenna pairs. For example, where there are 24 antenna elements, switch 106 may have 24 inputs and 4 outputs. In the case where the number of inputs is a large number, such as 24, switch 106 may also be referred to as a switch matrix. Additional inputports to switch 106 may be needed to support receiver calibration signal injection. A microwave switch 106 of this nature is currently not an off-the-shelf component, but would have to be custom developed. It is important that switch 106 have excellent phase-tracking characteristics. Moreover, switch 106 must be fast-acting to support intra-pulse operation. Phase error offsets as a function of frequency may have to be stored to correct for switch phase-mistracking. Additionally, it is important to mount switch 106 as close as possible to the antenna elements 202 to minimize cable loss, which degrades system sensitivity. It will be apparent to one skilled in the art how to design and develop a switch suitable for a particular application.

Radio Frequency Converter

RF converter 108 downconverts the signals received from switch 106, and outputs the downconverted signals to IF processor 110. For example, in one embodiment, RF converter 108 may translate a 16 GHz wide RF spectrum into the frequency band of 2 to 6 GHz in four 4 GHz segments. These parameters are determined by the requirements of the particular application. The number of receiver channels required is also a system design variable. For instance, 24 receiver channels may be too expensive, might occupy too much volume, and may weigh too much. On the other hand, two receiver channels may not have the capacity to move between antenna pair signals rapidly enough. Following the switch 106 example of the prior section, RF converter 108 would include four receiver channels. RF converter 108 probably would be built from multiple subassemblies supplied by several vendors. It will be apparent to one skilled in the art how to design and develop an RF converter suitable for a particular application.

Intermediate Frequency Processor

IF processor 110 receives the downconverted signals from RF converter 108. IF processor 110 then measures frequency and phase differences (modulo 360 degrees) across the baselines for the selected pairs of antennas, and outputs the measured frequency and phase data to AR processor 112. Following the example described in the above section, the input to IF processor 110 would be in the 2 GHz to 6 GHz frequency region. Once again, these parameters would be determined by the requirements of the particular application. In this example, at any one instant in time, IF processor 110 is presented with 25 percent of the input spectrum.

IF processor 110 contains both analog and digital circuitry which measure signal parameters. The two most important parameters for the present invention are signal frequency and phase differences across the antenna baselines. Other signal parameters that may be measured by IF processor 110 include amplitude, pulse time-of-arrival, pulse width, and other signal modulation descriptors. IF processor 110 probably would be built from multiple subassemblies supplied by several vendors. It will be apparent to one skilled in the art how to design and develop an IF processor suitable for a particular application.

Ambiguity Resolution Processor

AR processor 112 receives the measured frequency and phase data from IF processor 110. AR processor 112 selects antenna pairs by providing control signals to switch 106. AR processor 112 receives the measured frequency and phase data of selected antenna pairs from IF processor 110, and receives the heading, pitch, and roll data from the platform's navigation system 116. AR processor 112 resolves the interferometer phase ambiguities according to the present invention as described below, performs heading, pitch, and roll corrections, and calculates the azimuth and elevation angles of arrival corresponding to the received signal. AR processor 112 outputs the azimuth and elevation angles, and frequency of the received signal, in output signal 114.

AR processor 112 may contain digital hardware, including Application Specific Integrated Circuits (ASICs) and microprocessors, software, and firmware. AR processor 112 may actually be divided into two separate parts, a preprocessor and a back-end processor. The preprocessor's job is to reduce the processing burden on the back-end processor, which accomplishes higher level processing tasks. The back-end processor performs higher level processing tasks and system control functions in software. Examples of higher level processing tasks include emitter, platform, and weapon system identification, and passive ranging. Whether ambiguity resolution occurs in the preprocessor or the processor is a system level design decision. AR processor 112 would likely be comprised of multiple subassemblies supplied by several vendors. It will be apparent to one skilled in the art how to design and develop an AR processor suitable for a particular application.

3. Operation of the Invention

In accordance with the present invention, IF processor 110 performs phase measurements for the pairs of antenna elements selected by AR processor 112. The phase difference, $\Psi_k$, measured by IF processor 110 for the $k^{th}$ pair of antennas is given by the relationship shown in the phase difference equation:

$$\Psi_k \cong A_k u + B_k w - 2\pi M_k$$

for $1 \leq k \leq N$,

Where:

-continued $\Psi_k$ = $k^{th}$ phase measurement (modulo $2\pi$)

$A_k$ = $\dfrac{2\pi D_{yk}}{\lambda}$ $B_k$ = $\dfrac{2\pi D_{zk}}{\lambda}$

AZ = azimuth angle of arrival of the signal

EL = elevation angle of arrival of the signal $u$ = $\sin(AZ)\cos(EL)$ $w$ = $\sin(EL)$ $M_k$ = ambiguity integer for the $k^{th}$ phase measurement $k$ = antenna-pair number $N$ = number of antenna-pairs $D_{yk}$ = the y-component of the length of the $k^{th}$ pair baseline $D_{zk}$ = the z-component of the length of the $k^{th}$ pair baseline $\lambda$ = wavelength of the signal.

Without phase errors, the left side of the phase difference equation is equal to the right side. In a real system with phase errors, however, the left side of the phase difference equation is nearly equal to the right side.

Figure 5:
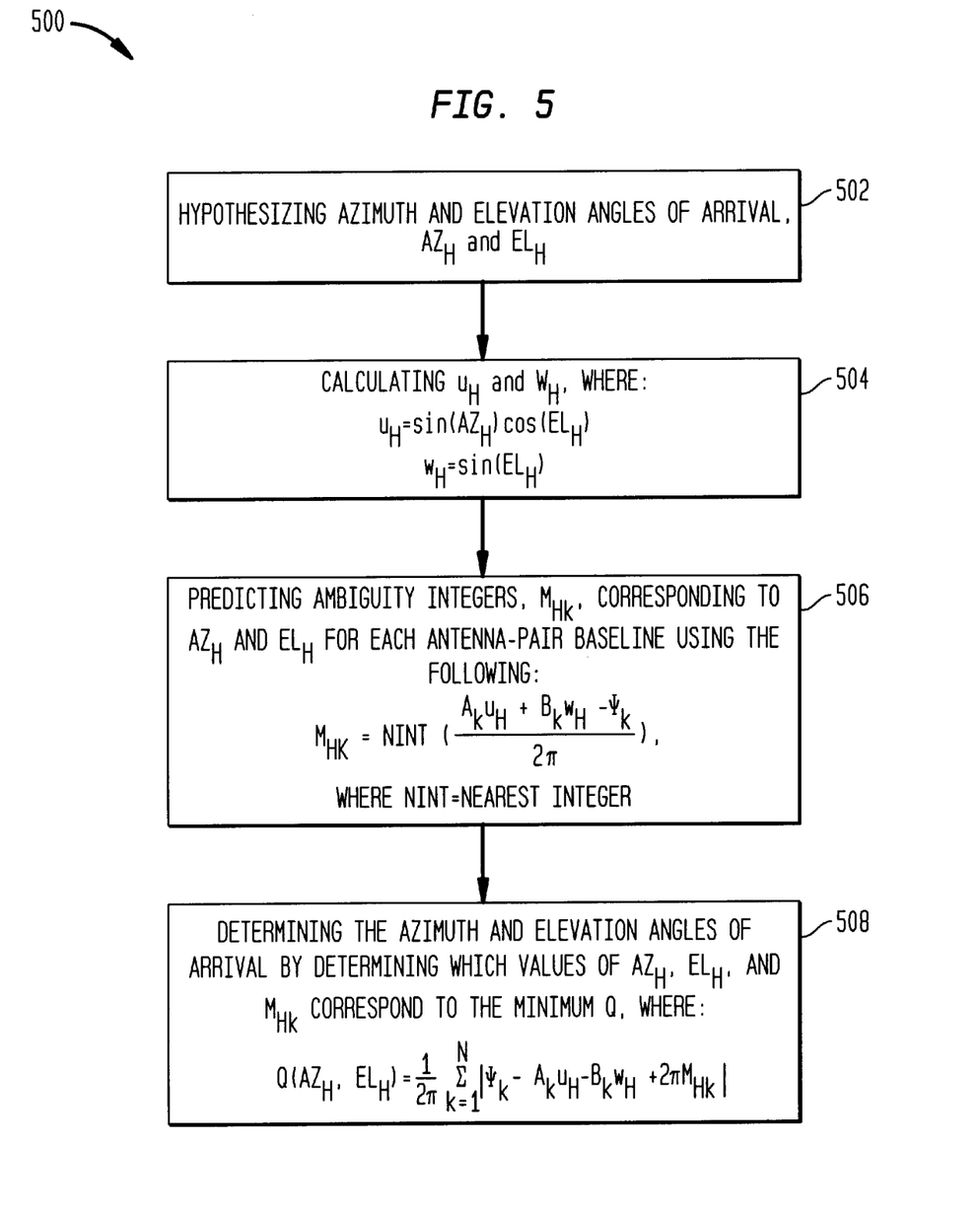
FIG. 5 shows a block diagram of an embodiment of the present invention for determining the azimuth and elevation angles of arrival of a signal.

With reference now to FIG. 5, a block diagram 500 depicts the preferred operation of the present invention. Block diagram 500 shows a method for resolving the interferometer phase ambiguities and finding the azimuth and elevation angles that satisfy the phase difference equation.

In a step 502, the azimuth and elevation angles of arrival, $AZ_H$ and $EL_H$, are hypothesized. To determine accurate values for the azimuth and elevation angles of arrival, $AZ_H$ and $EL_H$ are swept in fine increments over the spatial region of interest.

In a step 504, $u_H$ and $w_H$ are calculated, using the equations:

$$u_H = \sin(AZ_H)\cos(EL_H)$$

$$w_H = \sin(EL_H)$$

In a step 506, the ambiguity integers, $M_{Hk}$, corresponding to $AZ_H$ and $EL_H$ for each antenna-pair baseline, are predicted, using the equation:

$$M_{Hk} = NINT\left(\dfrac{A_k u_H + B_k w_H - \Psi_k}{2\pi}\right),$$

Where:

NINT = nearest integer $\Psi_k$ = $k^{th}$ phase measurement (modulo $2\pi$)

$A_k$ = $\dfrac{2\pi D_{yk}}{\lambda}$ $B_k$ = $\dfrac{2\pi D_{zk}}{\lambda}$ $k$ = antenna-pair number $D_{yk}$ = the y-component of the length of the $k^{th}$ pair baseline $D_{zk}$ = the z-component of the length of the $k^{th}$ pair baseline $\lambda$ = wavelength of the signal In a step 508, the azimuth and elevation angles of arrival of signal 102 are determined, by determining which values of $AZ_H$, $EL_H$, and $M_{Hk}$ correspond to the minimum Q, using the equation shown:

$$Q(AZ_H, EL_H) = \dfrac{1}{2\pi}\sum_{k=1}^{N}|\Psi_k - A_k u_H - B_k w_H + 2\pi M_{Hk}|$$

Where:

N = number of antenna-pairs

The azimuth and elevation angles of arrival of received signal 102 are the $AZ_H$ and $EL_H$ that correspond to the minimum $Q(AZ_H, EL_H)$. Heading, pitch, and roll corrections may be performed on the calculated azimuth and elevation angles of arrival. The corrections necessary would be apparent to one skilled in the art.

Figure 6:
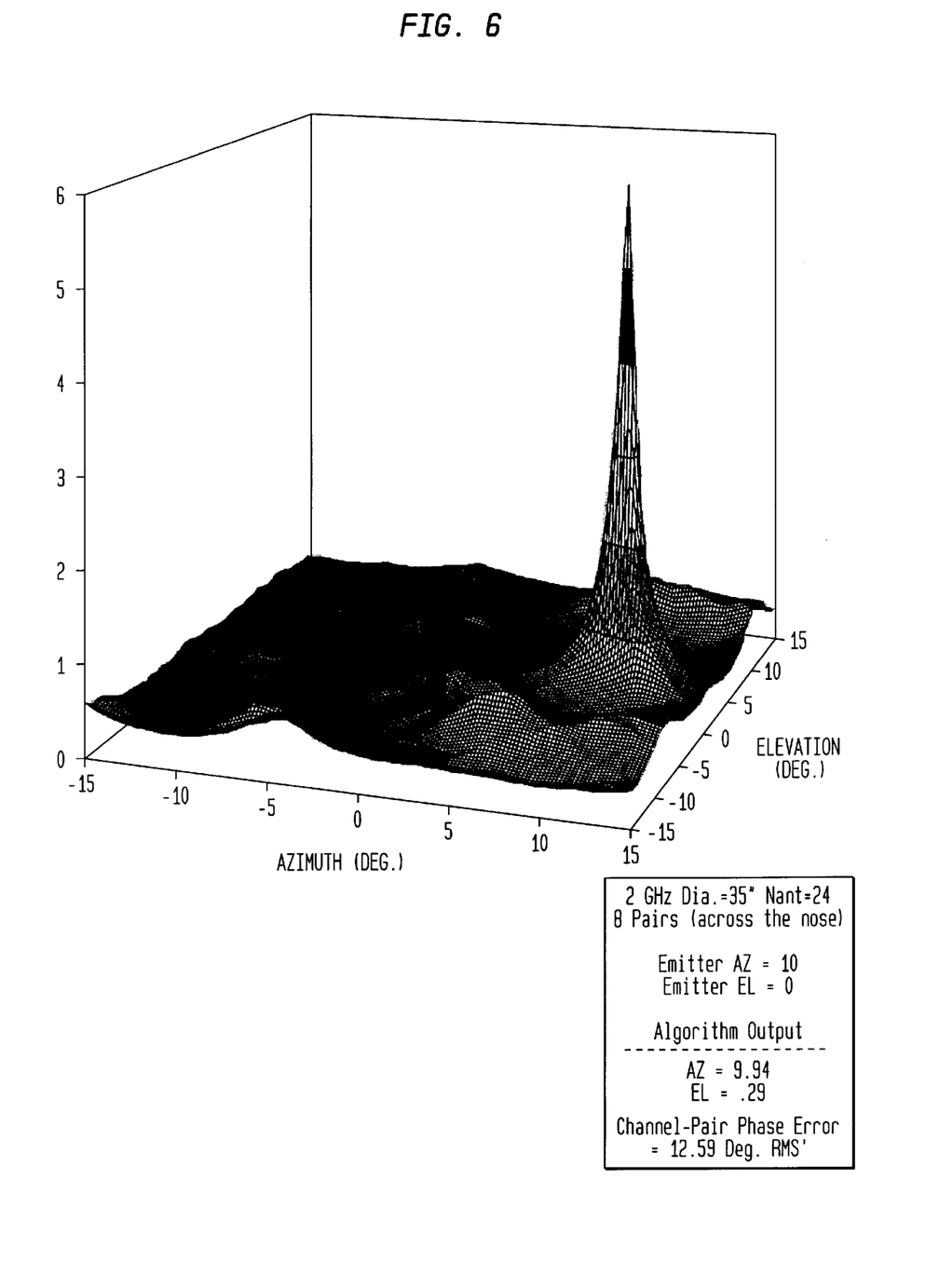
FIG. 6 is a graph illustrating the determination of the azimuth and elevation angles of a received signal.
Figure 7:
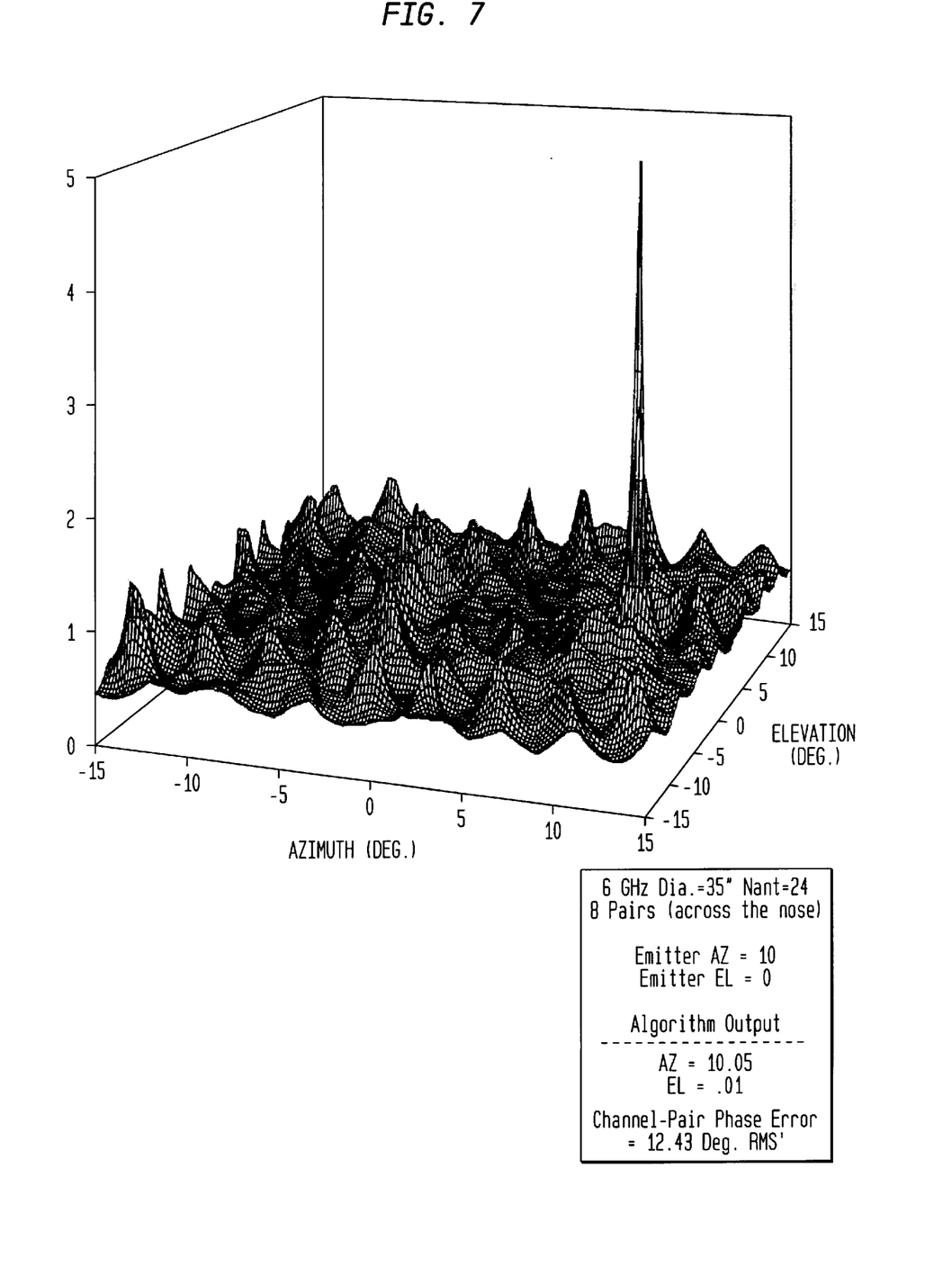
FIG. 7 is a graph illustrating the determination of the azimuth and elevation angles of a received signal having a frequency higher than the frequency of the signal utilized in FIG. 6.
Figure 8:
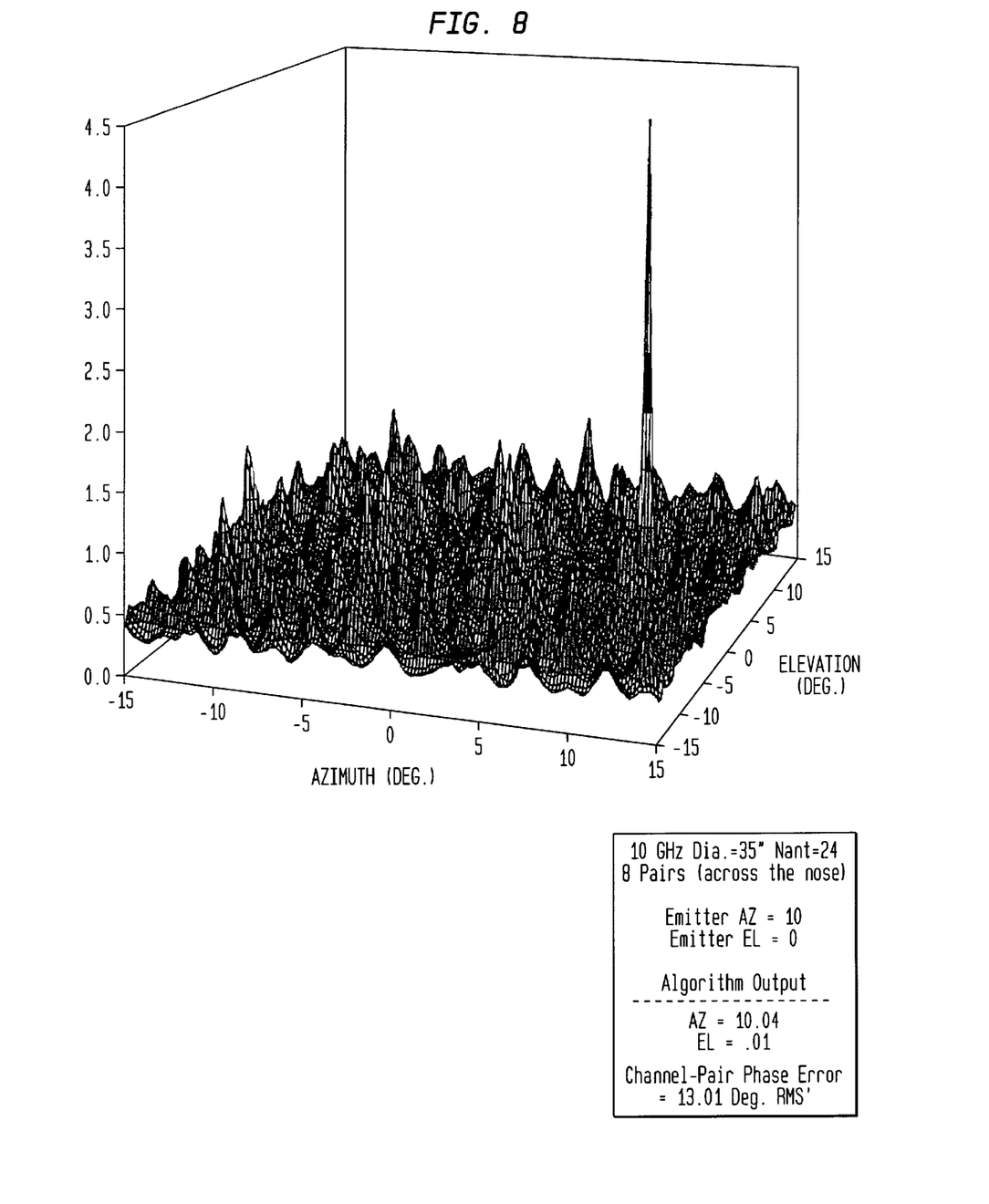
FIG. 8 is a graph illstratig the determination of the azimuth and elevation angles of a received signal having a frequency higher than the frequency of the signal utilized in FIG. 7.

FIGS. 6, 7, and 8 illustrate an embodiment of the present invention where 8 antenna pairs are used. In these examples, the length of the baseline of each antenna-pair is 35 inches, a distance which is on the order of the dimensions pertaining to a tactical aircraft application.

In the examples shown in FIGS. 6, 7, and 8, the reciprocal of $Q(AZ_H, EL_H)$ has been plotted versus $AZ_H$ and $EL_H$, for signal frequencies of 2, 6, and 10 GHz respectively. In each example, the tallest stalagmite occurs very near the correct azimuth and elevation angles of arrival. In a preferred embodiment, to improve azimuth and elevation accuracy, the spatial region in the vicinity of the correct stalagmite may be scanned with even finer $AZ_H$ and $EL_H$ increments. In an alternative embodiment, $u_H$ and $w_H$ can be swept and azimuth and elevation values can be calculated from the $u_H$ and $w_H$ that correspond to the minimum $Q(u_H, w_H)$.

It will be recognized by those skilled in the art that the phase difference equation presents a Mixed Integer Programming (MIP) problem. Furthermore, it will be recognized by those skilled in the art that the N equations specified by the phase difference equation can be reduced to N−2 equations through the elimination of the variables u and w, thereby eliminating spatial variables from the equations altogether. It will be recognized by those skilled in the art that there are commercially available products that solve MIP problems. Suitable commercially available products for solving MIP problems include LINGO, supplied by Lindo Systems Inc.; XPRESS-MP, supplied by Dash Associates; and Premium Solver Plus, supplied by Frontline Systems.

In a further embodiment, the phase difference equation can be extended into three-dimensional space by adding a term that accounts for the x-component of the antenna-pair baseline. Adding this term results in the following:

$$\Psi_k \cong A_k u + B_k w + C_k v - 2\pi M_k$$

Where:

$v$ = $\cos(AZ)\cos(EL)$ $C_k$ = $\dfrac{2\pi D_{xk}}{\lambda}$ $D_{xk}$ = the x-component of the length of the $k^{th}$ pair baseline This equation describes one, two, and three-dimensional interferometers.

CONCLUSION

While various embodiments of the present invention have been described above, it should be understood that they have been presented by way of example only, and not limitation.

It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for determining the azimuth and elevation angles of arrival of a signal using an apparatus for electromagnetic direction finding, wherein said apparatus includes an antenna array, wherein said antenna array includes having one or more pairs of antenna elements of like polarizations mounted diametrically opposite each other in a ring, wherein said antenna array receives said signal, said method comprising the steps of:

(a) measuring a phase difference across an antenna pair baseline for each of at least one antenna pair in said antenna array;

(b) hypothesizing azimuth and elevation angles of arrival of said signal;

(c) calculating $u_H$ and $w_H$, wherein $u_H$ and $w_H$ are determined by $$u_H = \sin(AZ_H)\cos(EL_H)$$

$$w_H = \sin(EL_H)$$

where
$AZ_H$ = the hypothesized azimuth angle of arrival, and
$EL_H$ = the hypothesized elevation angle of arrival;

(d) predicting ambiguity integers corresponding to said hypothesized azimuth and elevation angles of arrival for said each of at least one antenna pair, wherein said ambiguity integers are determined by $$M_{Hk} = NINT\left(\frac{A_k u_H + B_k w_H - \Psi_k}{2\pi}\right)$$

where $M_{Hk}$ = ambiguity integer for each antenna pair,
$NINT$ = nearest integer,
$\Psi_k$ = $k^{th}$ phase measurement (modulo $2\pi$),
$A_k$ = $\frac{2\pi D_{yk}}{\lambda}$,
$B_k$ = $\frac{2\pi D_{zk}}{\lambda}$,
$M_k$ = ambiguity integer for the $k^{th}$ phase measurement,
$k$ = antenna-pair number,
$N$ = number of antenna-pairs,
$D_{yk}$ = the y-component of the length of the $k^{th}$ pair baseline,
$D_{zk}$ = the z-component of the length of the $k^{th}$ pair baseline, and
$\lambda$ = wavelength of the signal; and (e) determining said azimuth and elevation angles of arrival of said signal by determining which values of $AZ_H$, $EL_H$, and $M_{Hk}$ correspond to the minimum Q, wherein said Q is determined by:

$$Q(AZ_H, EL_H) = \frac{1}{2\pi}\sum_{k=1}^{N} |\Psi_k - A_k u_H - B_k w_H + 2\pi M_{Hk}|.$$

2. The method of claim 1, further comprising the step of:

mounting the antenna array to an aircraft or missile.

3. The method of claim 1, wherein said measuring step includes the steps of:

selecting an antenna element pair, wherein antenna elements of the selected antenna element pair are mounted diametrically opposite each other in the ring; and measuring the phase difference of the received signals across the selected antenna element pair.

4. A method for determining the azimuth and elevation angles of a signal, comprising the steps of:

receiving said signal with an antenna array, wherein said antenna array includes one or more pairs of antenna elements of like polarization mounted diametrically opposite each other in a ring;

outputting a processor-selectable number of signals from a switch, wherein said switch receives said received signal from said antenna pairs;

downconverting said processor-selectable number of signals;

measuring phase differences across the antenna pair baselines for said downconverted signals; and determining the azimuth and elevation angles of said received signal using said measured phase differences from antenna pairs selected by said switch.

5. The method of claim 4, wherein said determining step comprises the steps of:

hypothesizing said azimuth and elevation angles of arrival;

calculating $u_H$ and $w_H$, wherein $u_H$ and $w_H$ are determined by $$u_H = \sin(AZ_H)\cos(EL_H)$$

$$w_H = \sin(EL_H)$$

where
$AZ_H$ = the hypothesized azimuth angle of arrival, and
$EL_H$ = the hypothesized elevation angle of arrival;

predicting ambiguity integers corresponding to said hypothesized azimuth and elevation angles of arrival for each antenna pair, wherein said ambiguity integers are determined by $$M_{Hk} = NINT\left(\frac{A_k u_H + B_k w_H - \Psi_k}{2\pi}\right)$$

-continued where

| | | |
|---|---|---|
| $M_{Hk}$ | = | ambiguity integer for each antenna pair, |
| NINT | = | nearest integer, |
| $\Psi_k$ | = | $k^{th}$ phase measurement (modulo $2\pi$), |
| $A_k$ | = | $\dfrac{2\pi D_{yk}}{\lambda}$, |
| $B_k$ | = | $\dfrac{2\pi D_{zk}}{\lambda}$, |
| $M_k$ | = | ambiguity integer for the $k^{th}$ phase measurement, |
| $k$ | = | antenna-pair number, |
| $N$ | = | number of antenna-pairs, |
| $D_{yk}$ | = | the y-component of the length of the $k^{th}$ pair baseline, |
| $D_{zk}$ | = | the z-component of the length of the $k^{th}$ pair baseline, and |
| $\lambda$ | = | wavelength of the signal; and | determining the azimuth and elevation angles of arrival, by determining which values of $AZ_H$, $EL_H$, and $M_{Hk}$ correspond to the minimum Q, wherein said Q is determined by:

$$Q(AZ_H, EL_H) = \frac{1}{2\pi} \sum_{k=1}^{N} |\Psi_k - A_k u_H - B_k w_H + 2\pi M_{Hk}|.$$

6. The method of claim 4, wherein said determining step further includes the steps of:
receiving heading, pitch, and roll data from a platform's navigation system; and
performing heading, pitch, and roll corrections to said determined azimuth and elevation angles of arrival.

7. The method of claim 4, further comprising the step of:
mounting the antenna array to an aircraft or missile.

8. The method of claim 4, wherein said measuring step includes the steps of:
selecting an antenna element pair, wherein antenna elements of the selected antenna element pair are mounted diametrically opposite each other in the ring; and
measuring the phase difference of the downconverted signals across the selected antenna element pair.

9. An electromagnetic direction finding apparatus for determining the azimuth and elevation angles of a signal, comprising:
an antenna array for receiving said signal, wherein said antenna array includes one or more pairs of antenna elements of like polarization mounted diametrically opposite each other in a ring;
a switch for receiving said received signal from said antenna pairs, wherein said switch outputs a processor-selectable number of signals;
a radio frequency converter for downconverting said processor-selectable number of signals, wherein said converter outputs the downconverted signals;
an intermediate frequency processor for measuring phase differences across the antenna pair baselines for said downconverted signals, wherein said intermediate frequency processor outputs said measured frequency and said phase difference data; and
an ambiguity resolution processor for selecting said antenna pairs by controlling said switch, wherein said ambiguity resolution processor receives the measured frequency and phase difference data from said intermediate frequency processor, and wherein said ambiguity resolution processor determines the azimuth and elevation angles of arrival corresponding to said signal.

10. The apparatus of claim 9, wherein said ambiguity resolution processor includes:
a hypothesizer for hypothesizing said azimuth and elevation angles of arrival;
a calculator for calculating $u_H$ and $w_H$, wherein $u_H$ and $w_H$ are determined by $$u_H = \sin(AZ_H)\cos(EL_H)$$

$$w_H = \sin(EL_H)$$

where
$AZ_H$ = the hypothesized azimuth angle of arrival, and
$EL_H$ = the hypothesized elevation angle of arrival;
a predictor for predicting ambiguity integers corresponding to said hypothesized azimuth and elevation angles of arrival for each antenna pair, wherein said ambiguity integers are determined by $$M_{Hk} = NINT\left(\frac{A_k u_H + B_k w_H - \Psi_k}{2\pi}\right)$$

where

| | | |
|---|---|---|
| $M_{Hk}$ | = | ambiguity integer for each antenna pair, |
| NINT | = | nearest integer, |
| $\Psi_k$ | = | $k^{th}$ phase measurement (modulo $2\pi$), |
| $A_k$ | = | $\dfrac{2\pi D_{yk}}{\lambda}$, |
| $B_k$ | = | $\dfrac{2\pi D_{zk}}{\lambda}$, |
| $M_k$ | = | ambiguity integer for the $k^{th}$ phase measurement, |
| $k$ | = | antenna-pair number, |
| $N$ | = | number of antenna-pairs, |
| $D_{yk}$ | = | the y-component of the length of the $k^{th}$ pair baseline, |
| $D_{zk}$ | = | the z-component of the length of the $k^{th}$ pair baseline, and |
| $\lambda$ | = | wavelength of the signal; and | a determiner for determining the azimuth and elevation angles of arrival of said signal, by determining which values of $AZ_H$, $EL_H$, and $M_{Hk}$ correspond to the minimum Q, wherein said Q is determined by:

$$Q(AZ_H, EL_H) = \frac{1}{2\pi} \sum_{k=1}^{N} |\Psi_k - A_k u_H - B_k w_H + 2\pi M_{Hk}|.$$

11. The apparatus of claim 9, wherein said ambiguity resolution processor receives heading, pitch, and roll data from a platform's navigation system and performs heading, pitch, and roll corrections to said determined azimuth and elevation angles of arrival.

12. The apparatus of claim 9, wherein the antenna array is mounted to an aircraft or a missile.

13. A method for determining the azimuth and elevation angles of a signal, comprising the steps of:
receiving the signal with an antenna array, wherein the antenna array includes one or more pairs of antenna elements of like polarization mounted diametrically opposite each other in a ring;

measuring phase differences of the received signal across one or more antenna element pair baselines; and determining the azimuth and elevation angles of the signal from the measured phase differences;

wherein said determining step includes the steps of:

hypothesizing the azimuth and elevation angles of arrival, calculating $u_H$ and $w_H$, wherein $u_H$ and $w_H$ are determined by $$u_H = \sin(AZ_H)\cos(EL_H)$$

$$w_H = \sin(EL_H)$$

where $AZ_H$=the hypothesized azimuth angle of arrival, and $EL_H$=the hypothesized elevation angle of arrival, predicting ambiguity integers corresponding to the hypothesized azimuth and elevation angles of arrival for each antenna pair, wherein the ambiguity integers ar(e determined by $$M_{Hk} = NINT\left(\frac{A_k u_H + B_k w_H - \Psi_k}{2\pi}\right)$$

where $M_{Hk}$ = ambiguity integer for each antenna pair, $NINT$ = nearest integer, $\Psi_k$ = $k^{th}$ phase measurement (modulo $2\pi$), $A_k$ = $\frac{2\pi D_{yk}}{\lambda}$, $B_k$ = $\frac{2\pi D_{zk}}{\lambda}$, $M_k$ = ambiguity integer for the $k^{th}$ phase measurement, $k$ = antenna-pair number, $N$ = number of antenna-pairs, $D_{yk}$ = the y-component of the length of the $k^{th}$ pair baseline, $D_{zk}$ = the z-component of the length of the $k^{th}$ pair baseline, and $\lambda$ = wavelength of the signal; and $M_k$=ambiguity integer for the $k^{th}$ phase measurement, k=antenna-pair number, N=number of antenna-pairs, $D_{yk}$=the y-component of the length of the $k^{th}$ pair baseline, $D_{zk}$=the z-component of the length of the $k^{th}$ pair baseline, and $\lambda$=wavelength of the signal, and determining the azimuth and elevation angles of arrival of the signal, by determining which values of $AZ_H$, $EL_H$, and $M_{Hk}$ correspond to the minimum Q, wherein the Q is determined by:

$$Q(AZ_H, EL_H) = \frac{1}{2\pi}\sum_{k=1}^{N} |\Psi_k - A_k u_H - B_k w_H + 2\pi M_{Hk}|.$$

14. The method of claim 13, wherein said se determining the azimuth and elevation angles of said signal using said measured phase differences furthers includes the steps of:

receiving heading, pitch, and roll data from a platform's navigation system; and performing heading, pitch, and roll corrections to said determined azimuth and elevation angles of arrival.

15. The method of claim 13, further comprising the step of:

mounting the antenna array to an aircraft or missile.

16. The method of claim 13, wherein said measuring step includes the steps of:

selecting an antenna element pair, wherein antenna elements of the selected antenna element pair are mounted diametrically opposite each other in the ring; and measuring the phase difference of the received signals across the selected antenna element pair.

* * * * *